(12) United States Patent
Uchida et al.

(10) Patent No.: US 7,970,337 B2
(45) Date of Patent: Jun. 28, 2011

(54) AUTOMATIC DOCUMENT FEEDER AND MANUSCRIPT SCANNER PROVIDED WITH PLATEN COVER WITH EASILY OPERABLE HANDLE

(75) Inventors: Toru Uchida, Shizuoka (JP); Kouichi Furutoh, Tokyo (JP)

(73) Assignee: NEC Corporation, Tokyo (JP)

( * ) Notice: Subject to any disclaimer, the term of this patent is extended or adjusted under 35 U.S.C. 154(b) by 1547 days.

(21) Appl. No.: 11/078,520

(22) Filed: Mar. 14, 2005

(65) Prior Publication Data

US 2005/0200920 A1 Sep. 15, 2005

(30) Foreign Application Priority Data

Mar. 15, 2004 (JP) ................................. 2004-072859

(51) Int. Cl.
*G03G 15/00* (2006.01)
(52) U.S. Cl. .................... 399/367; 400/691; 400/693
(58) Field of Classification Search .................. 399/367; 400/691, 693
See application file for complete search history.

(56) References Cited

U.S. PATENT DOCUMENTS

| 3,888,582 A | * | 6/1975 | Griswold | 355/69 |
| 5,022,639 A | * | 6/1991 | DuBois | 271/3.2 |
| 5,079,588 A | * | 1/1992 | Ohira et al. | 399/32 |
| 5,534,989 A | * | 7/1996 | Rubscha et al. | 399/381 |
| 5,832,356 A | * | 11/1998 | Kurando et al. | 399/367 |

FOREIGN PATENT DOCUMENTS

| JP | 57-073753 | 5/1982 |
| JP | 58-093076 | 6/1983 |
| JP | 02-181175 | 7/1990 |
| JP | 09-172526 | 6/1997 |
| JP | 2002-152462 | 5/2002 |
| JP | 2002-344695 | 11/2002 |
| JP | 2003-241460 | 8/2003 |
| JP | 2003-344960 A | 12/2003 |

* cited by examiner

*Primary Examiner* — Matthew G Marini
(74) *Attorney, Agent, or Firm* — Dickstein Shapiro LLP

(57) ABSTRACT

An automatic document feeder is mounted on a platen cover, which is located on a housing of a manuscript scanning section and movable relative to the housing to have open and shut states. The automatic document feeder is provided with: a manuscript stacker adapted to have manuscripts stacked on it; an outer frame structure having the manuscript stacker movable to attain the open and shut states; and a handle section provided integrally with the outer frame structure and disposed anteriorly to the manuscript stacker. The space between the manuscript stacker and the platen cover serves as a manuscript discharging section. The handle section is formed in a shape so as to avoid narrowing the entrance for inserting a hand into the manuscript discharging section.

9 Claims, 7 Drawing Sheets

AUTOMATIC DOCUMENT FEEDER AND MANUSCRIPT SCANNER PROVIDED WITH PLATEN COVER WITH EASILY OPERABLE HANDLE

BACKGROUND OF THE INVENTION

1. Field of the Invention

The present invention relates to a manuscript scanner included in a copy machine, an image scanner, a facsimile, etc. and particularly to an automatic document feeder for automatically feeding a manuscript to be scanned.

2. Description of the Related Art

Conventional manuscript scanners for a copy machine, an image scanner, a facsimile machine, etc. have a transparent plate (for example, a glass plate) as a manuscript scanning surface on which a manuscript is placed and scanned, and a platen cover for covering the manuscript scanning section to shut off the ambient light when scanning. There are two ways for placing a manuscript on the transparent plate of the manuscript scanning section: one being for the user to manually and directly place the manuscript on the plate of the manuscript scanning section, the other being for an automatic document feeder to supply the manuscript to the manuscript scanning section. In the former case, it is required to open the platen cover when placing or taking out the manuscript and shut the platen cover when scanning, and in order to meet this requirement, the platen cover is mounted on the housing of the manuscript scanning section so as to allow opening and shutting operations through a hinge mechanism.

The automatic document feeder, in contrast, is commonly constructed to be fitted on the platen cover to avoid an increase in the size and complexity of the manuscript scanner and further to shorten the feed distance of the manuscript to facilitate the feed operation and also simplify the structure. In this case, there is a structure in which a manuscript stacker for stacking manuscripts to be fed is disposed on the platen cover and the manuscripts that have been scanned are discharged on the platen cover.

In the structure in which the automatic document feeder is fitted on the platen cover, the automatic document feeder and platen cover are opened and shut as one unit. As a result, the platen cover fitted with the automatic document feeder is heavy as compared to the structure in which solely a platen cover is opened and shut, entailing difficulty in handling the platen cover unless the user holds it firmly by hand during the opening and shutting operations.

For this reason, there is a structure in which concave portions 22 are formed in platen cover 21 as illustrated in FIG. 1 and FIG. 2 to assist the user to facilitate holding it by hand (cf. Japanese Patent Laid-open No. 2002-152462) and a structure in which a handle is provided (cf. Japanese Patent Laid-open No. 93076/83).

In the case where it is unnecessary to provide a manuscript discharging section on a platen cover, as with the structure described in Japanese Patent Laid-open No. 93076/83, it will suffice to construct the platen cover and manuscript stacker so that they have a sufficient strength. In recent years, however, there has been a main tendency to adopt the structure in which manuscript discharging section 23 is provided on a platen cover 21, as described above, to achieve reduction in size and weight of the platen cover (cf. FIG. 1.) In the structure in which the manuscript stacker 24 is located on the platen cover 21 and the scanned manuscripts are discharged into the space (manuscript discharging section 23) on the platen cover 21, it is necessary for the user to insert a hand into the space between platen cover 21 and manuscript stacker 24 (manuscript discharging section 23) when the manuscript which has been scanned and discharged into the space is taken out. In order to facilitate removal of the manuscript, platen cover 21 has been formed thin as described in Japanese Patent Laid-open No. 2002-152462.

In the above structure, it is difficult to balance competing goals of both providing concave section 22, in platen cover 21, that has large enough dimensions to allow a user to lift it up by inserting a hand into concave section 22 in order to open and shut platen cover 21, and keeping sufficiently large space (manuscript discharging section 23) for the user to remove a manuscript with a hand which is inserted between platen cover 21 and manuscript stacker 24. In other words, concave section 22 is formed to protrude upward toward manuscript stacker 24, which narrows the entrance of manuscript discharging section 23. The position of concave section 22 is set up to the front of platen cover 21 which makes it easy for the user to handle, while the position is also suitable for the user to insert a hand into manuscript discharging section 23. For this reason, if the user inserts a hand into manuscript discharging section 23 from a position away from concave section 22, such operation is troublesome to the user. After all, unless the space between platen cover 21 and manuscript stacker 24 is sufficiently enlarged entailing an increase in the size of the device, it is difficult to attain both goals for facilitating the removal of a discharged manuscript after scanning and facilitating the opening and shutting operations of automatic document feeder 25 and platen cover 21.

If concave section 22 of platen cover 21 is formed in a size and a shape that is hard to handle, or disposed in a position that is hard to handle, as a result of facilitating the removal of a manuscript, the user might possibly perform opening and shutting operation of automatic document feeder 25 and platen cover 21 by grasping any other portion of platen cover 21 other than concave section 22. The user in many cases holds the platen cover 21 particularly while grasping the front portion of manuscript stacker 24. Manuscript stacker 24 itself, however, is in many cases constructed so that it can swing relative to platen cover 21 by means of a hinge structure etc. to enable recovery when manuscript jam (paper jam) occurs in automatic document feeder 25. In this arrangement, manuscript stacker 24 does not have sufficient strength and cannot endure the forces repeatedly exerted through frequent opening and shutting operations, possibly resulting in breakage. In other words, if the attempt to improve the operationality of the manuscript removal operation adversely entails degradation of the operationality for the opening and shutting operation of platen cover 21, then the user will selectively grasp any portion that is easy to hold and do the opening and shutting operation, as described above. This involves the possibility of breakage in manuscript stacker 24 which may not be sufficiently strong.

SUMMARY OF THE INVENTION

It is an object of the present invention to provide an automatic document feeder and a manuscript scanner having a handle section at the position that allows a user to easily handle the platen cover to facilitate opening and shutting thereof, wherein the handle section is adapted to have satisfactory strength, endurance and high reliability against breakage even if it is used over a long term.

The present invention provides an automatic document feeder comprising: a manuscript stacker adapted to stack one or more manuscripts; an outer frame structure on which the manuscript stacker is mounted; and a handle section positioned anteriorly to the manuscript stacker and integrally secured to said outer frame structure; said automatic document feeder being positioned on a platen cover located above a housing of a manuscript scanning section and movable with respect to the housing to have open and shut configurations. For reference, the outer frame structure includes the housing of a manuscript scanning section.

In this structure, the handle section is positioned anteriorly to the manuscript stacker and the position is nearest to an operator of the automatic document feeder and manuscript scanning section. Thus, handling is easy. As a result, it is feasible to reduce the possibility that the user will grasp any portion of the manuscript stacker and operate the stacker as in the case of a conventional manuscript scanner. In addition, the handle section is integrally formed, not with the manuscript stacker which has comparatively low strength, but with the outer frame structure which has comparatively high strength, and further the outer frame structure is a structural part of the automatic document feeder and has high mechanical strength. Consequently, this outer frame structure and handle section will have little possibility of breaking even if the handle section is grasped to implement the opening or shutting operation. For this reason, long term use of the outer frame structure and handle section will cause little possibility of breakage, whereby the reliability of the manuscript scanner is improved.

The present invention improves the operationality for the user when the user opens or shuts the platen cover mounted with the automatic document feeder. This is because the handle section is disposed at an easy to handle position anterior to the manuscript stacker and can be formed into a shape that is easy to grasp without narrowing the space defined between the manuscript stacker and platen cover. Thus, for example, users who have functional disorders in hands or wrists, particularly those users who have limitations in the rotation of their wrists, are able to perform opening and shutting operations with great ease by selecting any optimum wrist angle, thereby effecting so-called "barrier free" design.

The present invention is advantageous particularly in the case where a space is provided between the manuscript stacker and platen cover. Further, in the structure having a manuscript discharging section in the space between the manuscript stacker and platen cover, sufficient vertical space can be kept for the entrance of the manuscript discharging section without any interference by the handle section, to enable easy removal of a manuscript. In other words, the handle section in this case, formed in the foregoing shape for easy use, does not make the manuscript discharging section narrower and thus allows compatibility in achieving the two targets of easy removal of a discharged manuscript and easy handling to open and shut the automatic document feeder and platen cover.

A conveying mechanism, adapted for supplying a manuscript stacked in the manuscript stacker to said manuscript scanning section and feeding a manuscript positioned in the manuscript scanning section into the manuscript discharging section, can be incorporated in the outer frame structure. Further, the outer frame structure can be fixed to the platen cover, and the manuscript stacker is movable relative to the outer frame structure to attain the open and shut positions. This structure facilitates the recovery when a manuscript jam occurs in the conveying mechanism. While there exists a possibility that a manuscript stacker itself may have low strength, the present invention provides a low possibility for the user to grasp the manuscript stacker to perform opening and shutting manipulations of the manuscript stacker, and because the handle section is secured not to the manuscript stacker but to the outer frame structure which has high strength, the manuscript stacker is not affected by the opening and shutting operation, and hence there is no possibility that it will be damaged by long term use.

The handle section having a vertically short and horizontally elongated form in the shut state of the platen cover is advantageous, because a sufficiently large space can be kept in the vertical direction between the manuscript stacker and platen cover.

The manuscript scanner according to the present invention is provided with an automatic document feeder having any of the foregoing structures and a manuscript scanning section. The platen cover and automatic document feeder, when placed in the shut positions, act as a means for pressing a manuscript to the manuscript scanning plane.

The above and other objects, features and advantages of the present invention will become apparent from the following description with reference to the accompanying drawings, which illustrate examples of the present invention.

DESCRIPTION OF THE PREFERRED EMBODIMENT

Figure 3:
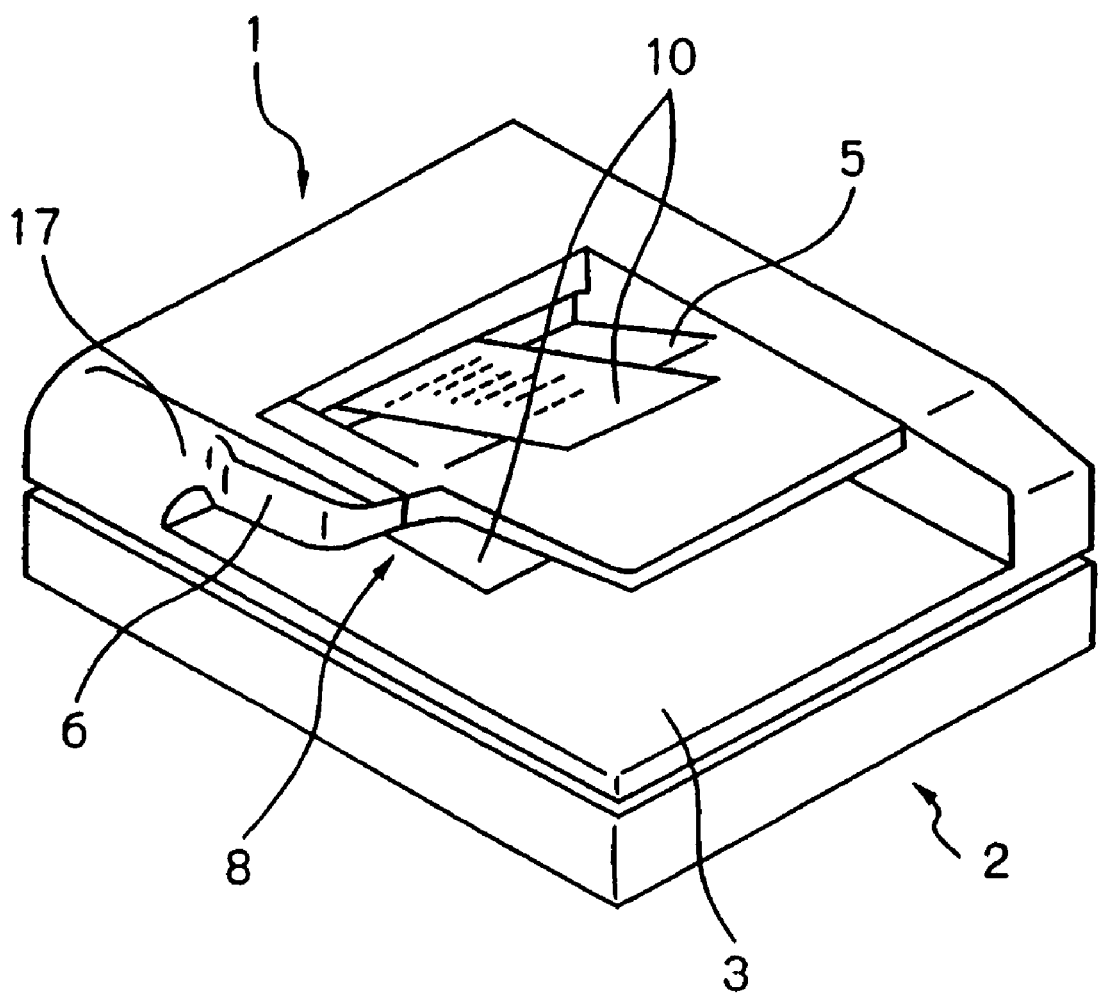
FIG. 3 is a perspective view illustrating the manuscript scanner provided with the automatic document feeder of the first embodiment according to the present invention.
Figure 4:
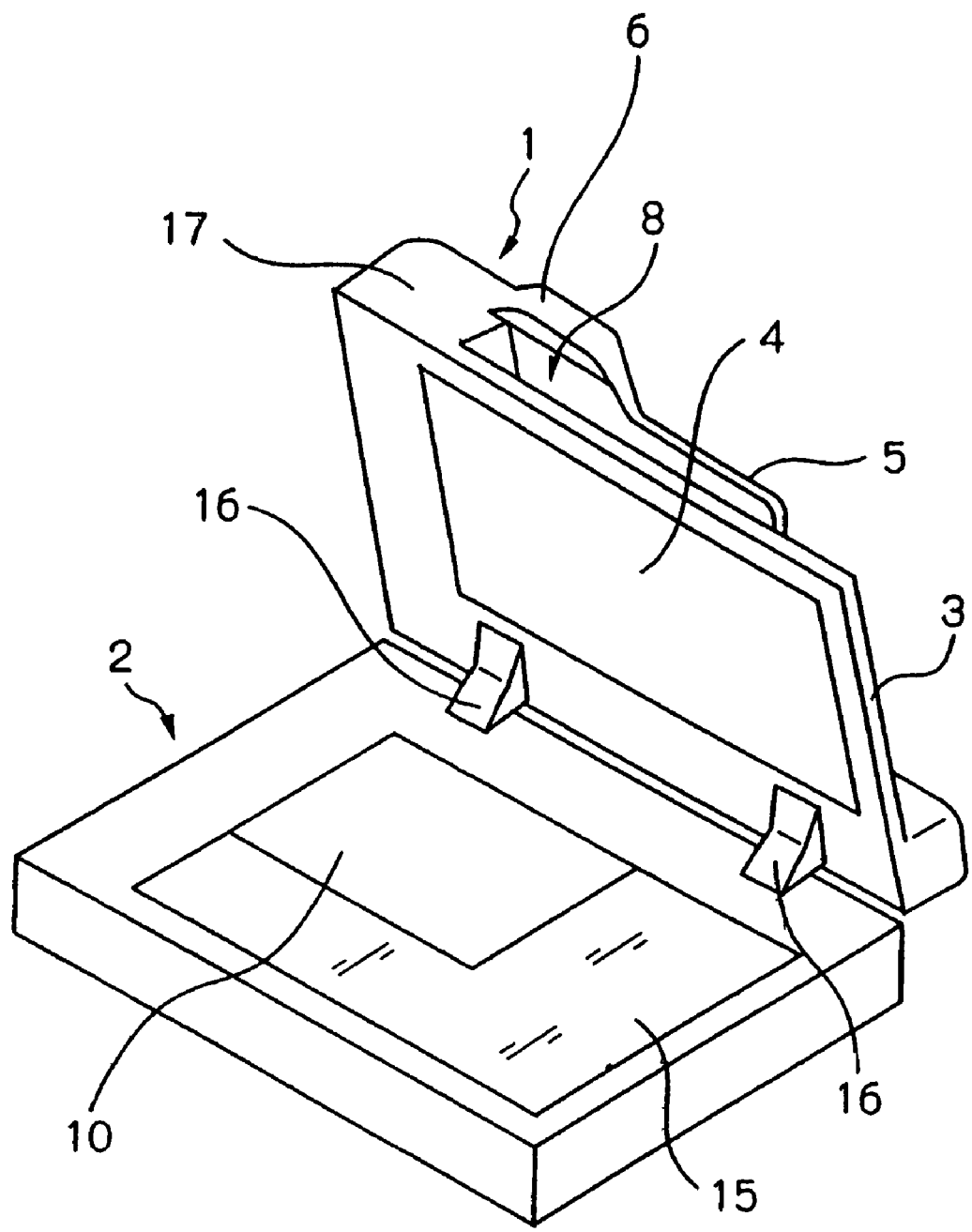
FIG. 4 is a perspective view illustrating the opened state of the platen cover and automatic document feeder of the manuscript scanner shown in FIG. 1.
Figure 5:
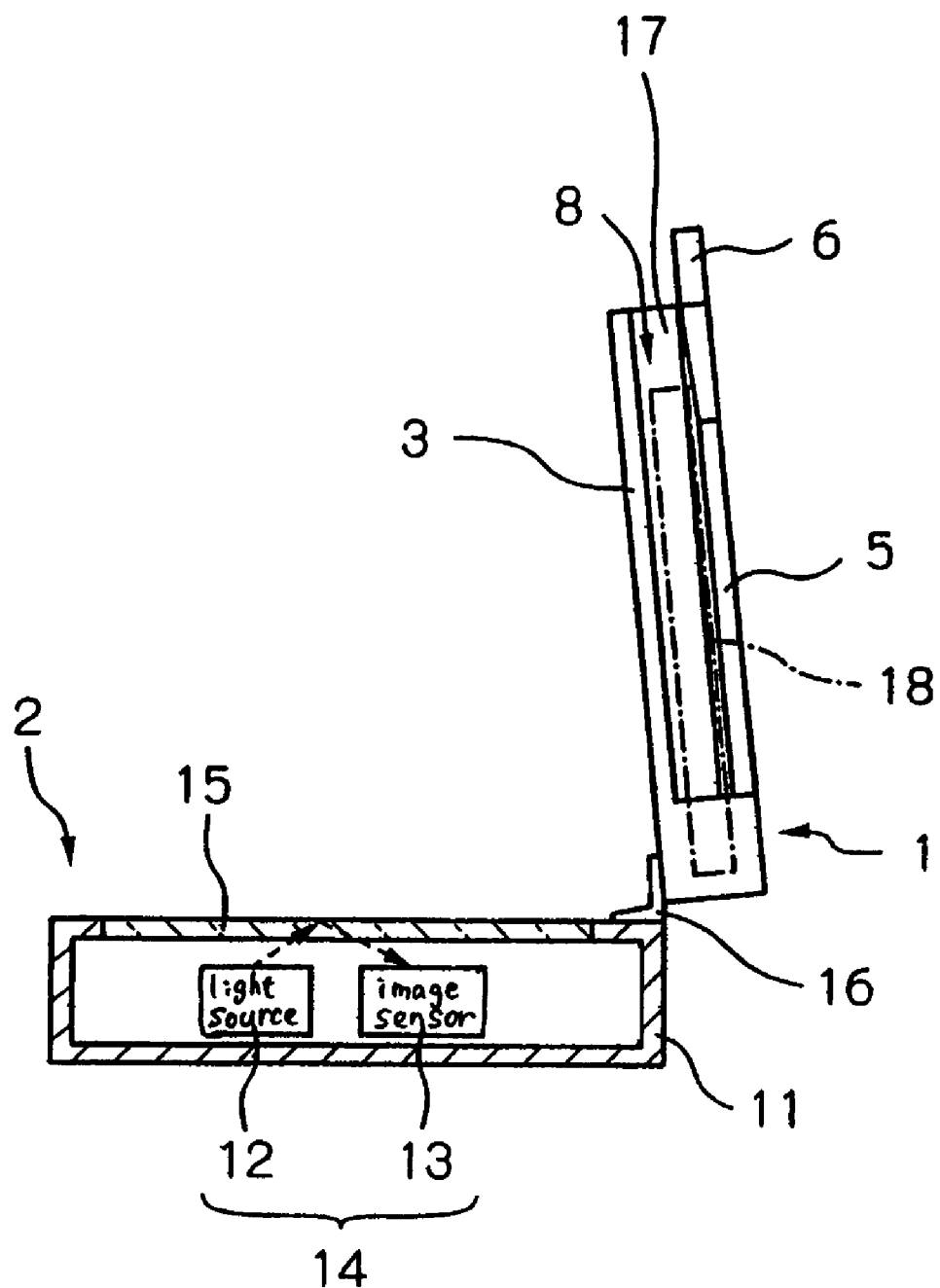
FIG. 5 is a side view schematically representing the structure of the manuscript scanner shown in FIG. 1.

FIG. 3 is a perspective view of the manuscript scanner according to the present invention, FIG. 4 is a perspective view of platen cover 3 and automatic document feeder 1 in an opened state of the manuscript scanner, and FIG. 5 is a schematic side view representing the internal structures of the manuscript scanner.

The manuscript scanner of the present embodiment has a structure in which automatic document feeder 1 is arranged on manuscript scanner section 2. Manuscript scanner section 2 receives known manuscript scanning arrangement 14 made up of light source 12 for irradiating manuscript 10 placed on a manuscript scanning plane with light and image sensor 13 such as CCD (charge-coupled device) that receives the reflected light coming from manuscript 10, as represented in FIG. 5. The manuscript scanning plane is made of a transparent plate 15 such as a glass plate disposed on the top plane of housing 11. In addition, platen cover 3 for covering the manuscript scanning plane to shut off light coming from the outside when scanning, is fitted on housing 11 to allow an open-shut movement with respect to housing 11 through a hinge mechanism 16. Automatic document feeder 1 is mounted on platen cover 3. Automatic document feeder 1 has manuscript stacker 5 and conveying mechanism 18 including rollers etc. for carrying sheets of manuscript 10 stacked in manuscript stacker 5 to the manuscript scanning plane one by one. For manuscript scanning arrangement 14 and conveying mechanism 18, any of all known structures can be adopted. Thus, the explanation regarding the detailed structures and operations thereof is omitted.

Explanation next regards the basic operation of this manuscript scanner. First, the user places manuscript 10 to be scanned on manuscript stacker 5 of automatic document feeder 1. Subsequently, turning-on the switch (not shown) activates conveying mechanism 18 of automatic document feeder 1 to supply manuscript 10 placed on manuscript stacker 5 to transparent plate 15 under platen cover 3. There, light source 12 irradiates manuscript 10 on transparent plate 15 with light and image sensor 13 receives the reflected light coming from manuscript 10. Although not described in detail, scanning the light over the entire manuscript 10 makes it feasible to scan the images (including letters and patterns) on the overall page of manuscript 10. Scanned manuscript 10 is automatically discharged onto platen cover 3 by conveying mechanism 18 of automatic document feeder 1. In this case, the space between platen cover 3 and manuscript stacker 5 defines manuscript discharging section 8, from which the user manually removes manuscript 10. In some cases, manuscript 10 is taken out sheet-by-sheet, while in the other cases, manuscript 10 is taken out as a single unit after several sheets have been stacked. In the present embodiment, manuscript discharging section 8, i.e., the space between platen cover 3 and manuscript stacker 5 is comparatively large so as to allow discharged manuscript 10 to be easily taken out. Specifically, comparatively thin-formed platen cover 3 and anteriorly located, horizontally elongated-shaped handle section 6 causes no blockage of the entrance of manuscript discharging section 8 and constitutes no obstacle to the insertion of a hand.

The scanned results provided from the manuscript are sent to a processing unit, to which the manuscript scanner is connected or attached, and processed according to the capability of the processing unit. Specifically, if the manuscript scanner is provided in a copy machine, an imaging device (not shown) prints the same image as a scanned image on a printing medium. If the manuscript scanner is an image scanner, then image data are sent to a host device such as a personal computer through an interface (not shown). Alternatively, if the manuscript scanner is provided in a facsimile machine, the image data are transmitted to an external device through telephone communication.

While the foregoing explanation regards the case where manuscript 10 on manuscript stacker 5 is automatically supplied onto transparent plate 15 of manuscript scanning section 2 by automatic document feeder 1, it is also possible in this manuscript scanner that a user manually sets manuscript 10. In this case, the user opens platen cover 3 on which automatic document feeder 1 is mounted, places manuscript 10 directly on transparent plate 15, and shuts platen cover 3 and automatic document feeder 1, as represented in FIGS. 4 and 5. Next, when the user turns on a switch (not shown), the same manuscript scanning operation as the foregoing operation is thereafter performed. Because the scanned manuscript 10 remains placed on transparent plate 15, the user again opens platen cover 3 and automatic document feeder 1 and removes manuscript 10 from transparent plate 15. As described above, when a user manually sets manuscript 10 directly onto transparent plate 15, it is necessary for the user to open and shut platen cover 3 and automatic document feeder 1 many times.

Because automatic document feeder 1 is arranged on platen cover 3, it is comparatively heavy and hence functions as a means to press and to steady manuscript 10 placed on the manuscript scanning plane when it is in the shut position. Pressing plane 4 is illustrated in FIG. 4. It is necessary to open and shut, i.e., to swing automatic document feeder 1 and platen cover 3 (to bring automatic document feeder 1 and platen cover 3 into the open and shut state) every time manuscript 10 is to be inserted and taken out. In the present embodiment, handle section 6 is provided as a handling member for opening and shutting. Handle section 6 is located anteriorly to manuscript stacker 5 of automatic document feeder 1 and integrally formed not with manuscript stacker 5 itself but with outer frame structure 17 of automatic document feeder 1. Outer frame structure 17 includes the housing of automatic document feeder 1.

Figure 6:
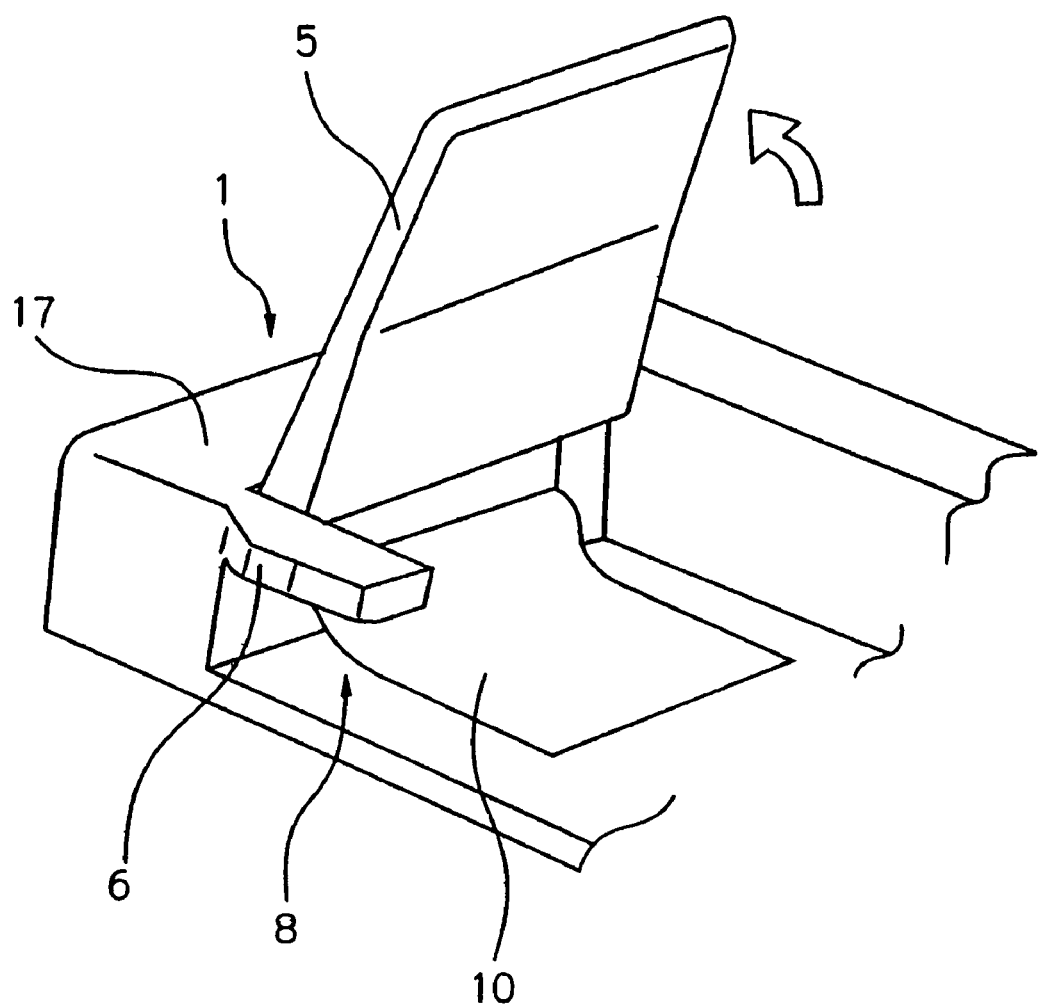
FIG. 6 is a perspective view illustrating the essential part of the opened state of the manuscript stacker of the manuscript scanner shown in FIG. 1.

Detailed explanation is next given regarding this point. Manuscript stacker 5 provided in automatic document feeder 1 is required to effect a maintenance capability when, for example, jamming of manuscript 10 (sheet jam) occurs in manuscript discharging section 8, in which manuscript stacker 5 is kept in an open state with respect to outer frame structure 17 so that the jammed manuscript 10, as shown in FIG. 6, can be removed in order to restore normal operation. In order to meet the above requirement, manuscript stacker 5 is structured to allow swing motion with respect to outer frame structure 17 through a hinge mechanism (not shown) etc. In addition, in the present embodiment, handle section 6 is secured not to manuscript stacker 5 but integrally to outer frame structure 17.

In the present embodiment, handle section 6 is arranged in the anterior portion of manuscript stacker 5. Accordingly, when a user intends to open or shut platen cover 3 and automatic document feeder 1, it is easier for the user to grasp handle section 6 in the anterior part of manuscript stacker 5 than to grasp the manuscript stacker 5 itself. As a result, a user hardly ever lifts or lowers heavy platen cover 3 and automatic document feeder 1 together by grasping manuscript stacker 5 that has comparatively low mechanical strength when it is intended to open and shut platen cover 3 and automatic document feeder 1 as with the case of the conventional manuscript scanner. Consequently, the possibility of breaking manuscript stacker 5 is reduced even if platen cover 3 and automatic document feeder 1 are repeatedly opened or shut. Furthermore, handle section 6 protrudes forward having a short vertical and long horizontal shape. This shape necessitates only a small space in the vertical direction, thereby enabling manuscript discharging section 8 to have a sufficiently large space between manuscript stacker 5 and platen cover 3.

Figure 1:
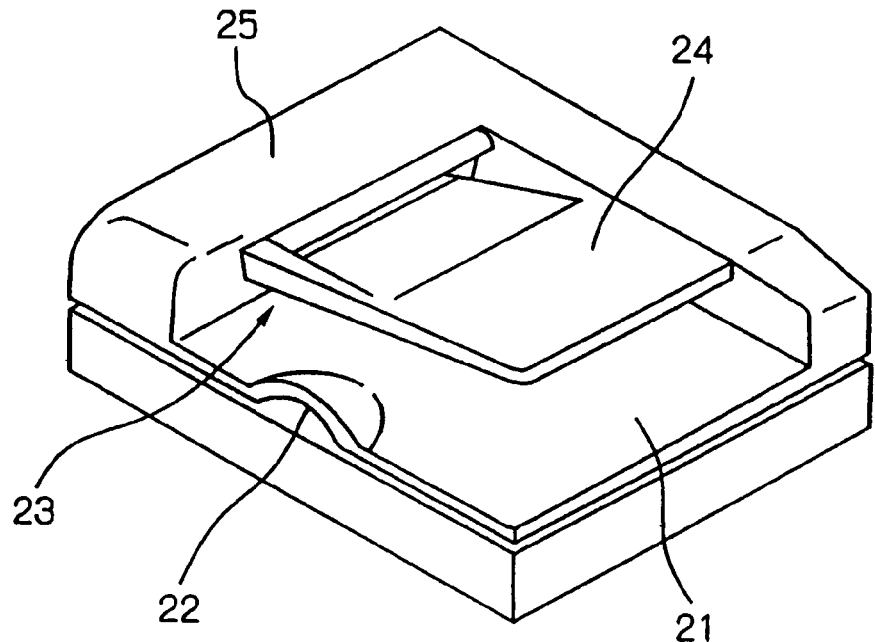
FIG. 1 is a perspective view of a conventional manuscript scanner having an automatic document feeder.
Figure 2:
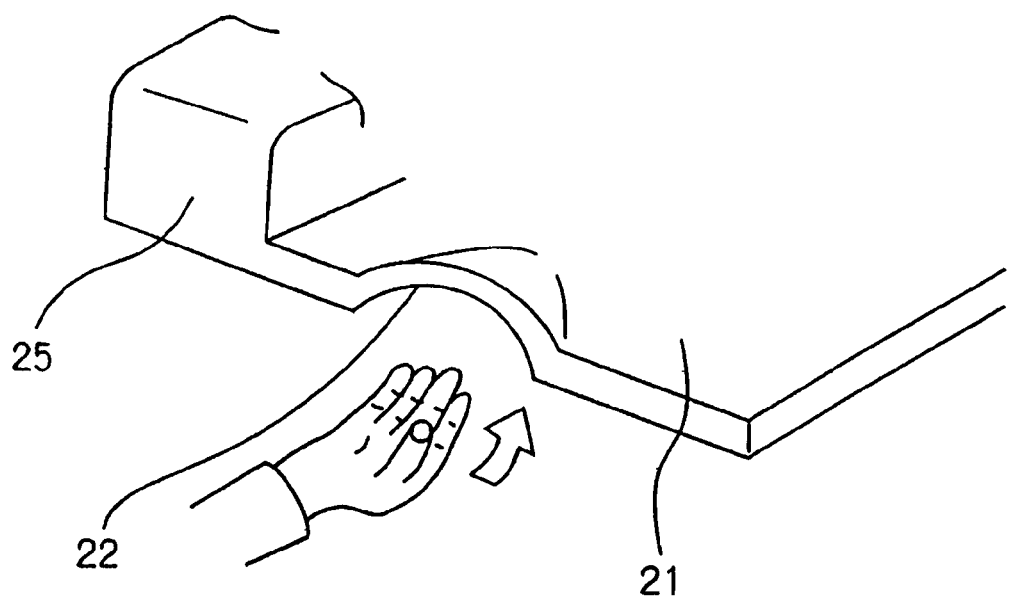
FIG. 2 is a perspective view illustrating the essential part for explaining the open and shut operations of the platen cover and automatic document feeder of the manuscript scanner shown in FIG. 1.

Concave portion 22 of the conventional manuscript scanner shown in FIGS. 1 and 2 has been commonly used for lifting and lowering operations with the palm of the user's hand directed upward and hand inserted into concave portion 22 when platen cover 21 and automatic document feeder 25 are opened and shut, and this has a significantly inferior operational performance if the concave portion is handled in a different way. This involves the possibility of great difficulty in opening and shutting operations for those who have hand or wrist functional disorders, particularly for those who have limitations in the rotation of their wrist. The present embodiment, in contrast, offers an advantage that, regardless of whether the user directs the palm of a hand in the upward direction or in the downward direction, the user can easily grasp handle section 6 to open and shut platen cover 3 and automatic document feeder 1 easily in a similar upward and downward direction, thereby effecting so-called "barrier free" design.

Figure 7:
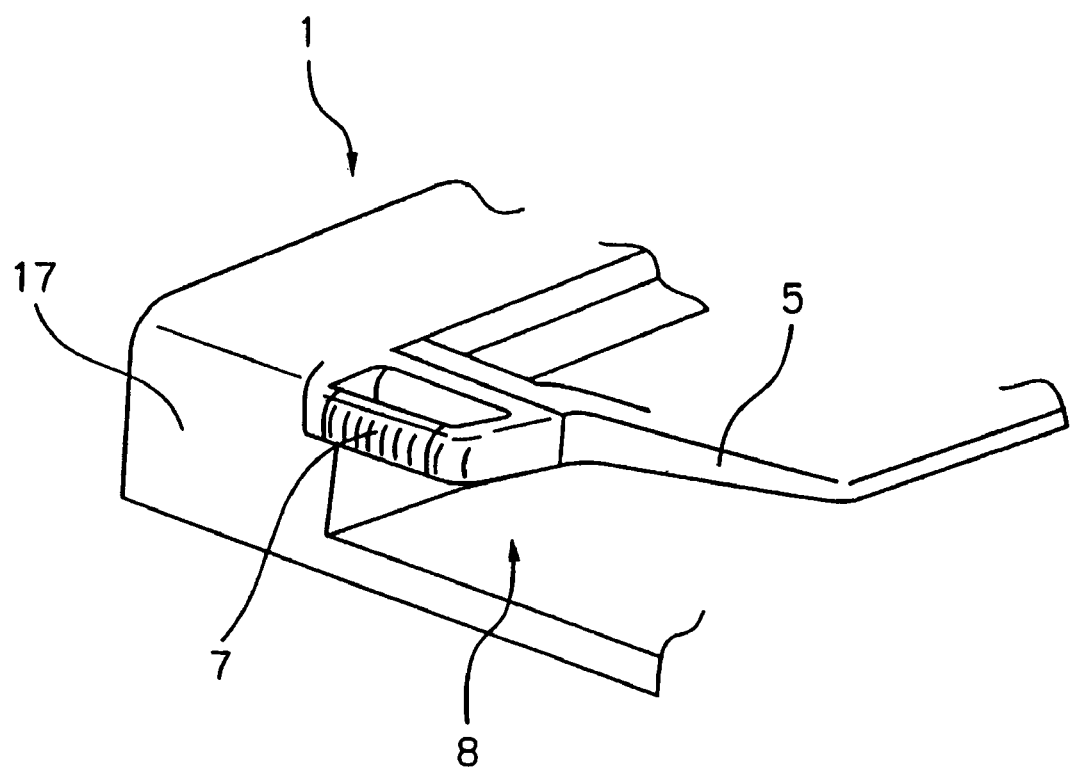
FIG. 7 is a perspective view illustrating the essential part of the manuscript scanner provided with the automatic document feeder of the second embodiment according to the present invention.
Figure 8:
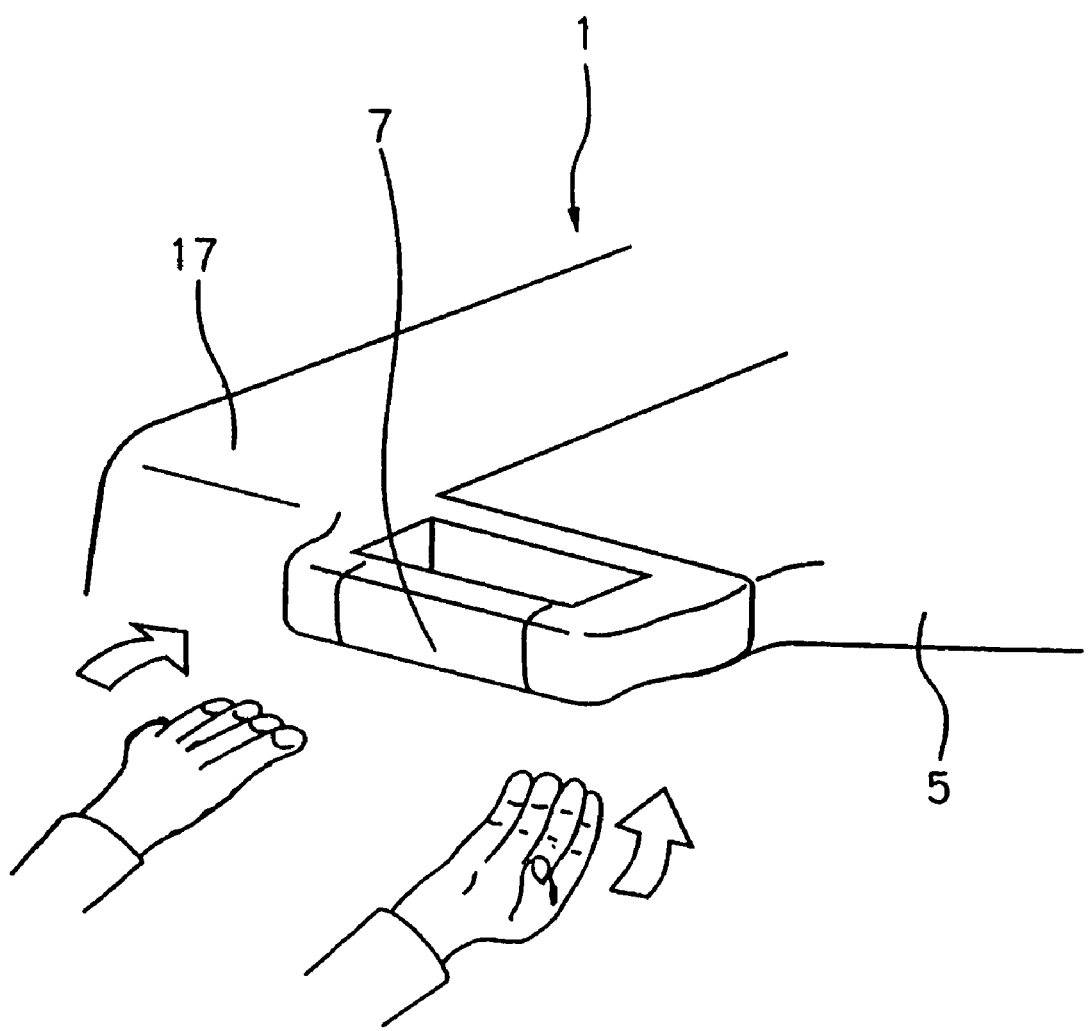
FIG. 8 is a perspective view illustrating the essential part to explain the open and shut handling of the platen cover and automatic document feeder of the manuscript scanner shown in FIG. 5.

Explanation next is presented regarding a second embodiment of the present invention referring to FIGS. 7 and 8. In the present embodiment, grip-formed handle sections 7 are provided in outer frame structure 17 and located in the anterior positions of manuscript stacker 5. The other items of the structure are identical with those of the first embodiment. Thus, the explanation is omitted. This structure offers better operational performance regardless of whether the user directs the palm of a hand in the up direction or in the down direction, thereby enabling the user to firmly grasp grip-formed handle section 7 easily.

In addition, the shape of the handle section is not limited to the examples described in the first and second embodiments and various modifications are possible. The handle section of the present invention need only be formed integrally not with manuscript stacker 5 but with outer frame structure 17 having high strength and further formed to avoid narrowing the space between manuscript stacker 5 and platen cover 3. The handle section of the present invention is particularly useful when manuscript stacker 5 is not integral to outer frame structure 17 and when manuscript stacker 5 has comparatively low strength.

While preferred embodiments of the present invention have been described using specific terms, such description is for illustrative purposes only, and it is to be understood that changes and variations may be made without departing from the spirit or scope of the following claims.

What is claimed is:

1. An automatic document feeder having an anterior side on which a user accesses documents, said automatic document feeder comprising:
   a manuscript stacker adapted to stack one or more manuscripts, the manuscript stacker having an anterior side toward said anterior side of said automatic document feeder;
   an outer frame structure on which said manuscript stacker is placed; and
   a handle section formed integrally with said outer frame structure and preventing access to at least a portion of said anterior side of said manuscript stacker;
   wherein said automatic document feeder is secured to a platen cover located above a housing of a manuscript scanning section and movable with respect to said housing to have open and shut states.

2. An automatic document feeder according to claim 1, provided with a space defined between said manuscript stacker and said platen cover.

3. An automatic document feeder according to claim 2, wherein said space defined between said manuscript stacker and said platen cover is utilized as a manuscript discharging section for discharging a scanned manuscript.

4. An automatic document feeder according to claim 3, wherein a conveying mechanism, adapted for supplying a manuscript stacked in said manuscript stacker to said manuscript scanning section and discharging a manuscript positioned in said manuscript scanning section into said manuscript discharging section, is incorporated in said outer frame structure.

5. An automatic document feeder according to claim 1, wherein said outer frame structure is fixed to said platen cover, and said manuscript stacker is movable relative to said outer frame structure to have open and shut states, wherein said handle prevents access to the at least the portion of said anterior side of the manuscript stacker when the manuscript stacker is in the shut state.

6. An automatic document feeder according to claim 1, wherein said handle section has a form which is short in the thickness direction of said platen cover and long in the direction along said platen cover.

7. An automatic document feeder according to claim 1, wherein said handle section has a vertically short and horizontally elongated form in said shut state of said platen cover.

8. A manuscript scanner provided with the automatic document feeder according to claim 1 and said manuscript scanning section.

9. A manuscript scanner according to claim 8, wherein said platen cover and said automatic document feeder act as a means for pressing down said manuscript to a manuscript scanning plane.

* * * * *